June 4, 1935.   P. DE V. D'AVOCOURT   2,003,994
MARBLE SAWING WIRE
Filed June 26, 1934
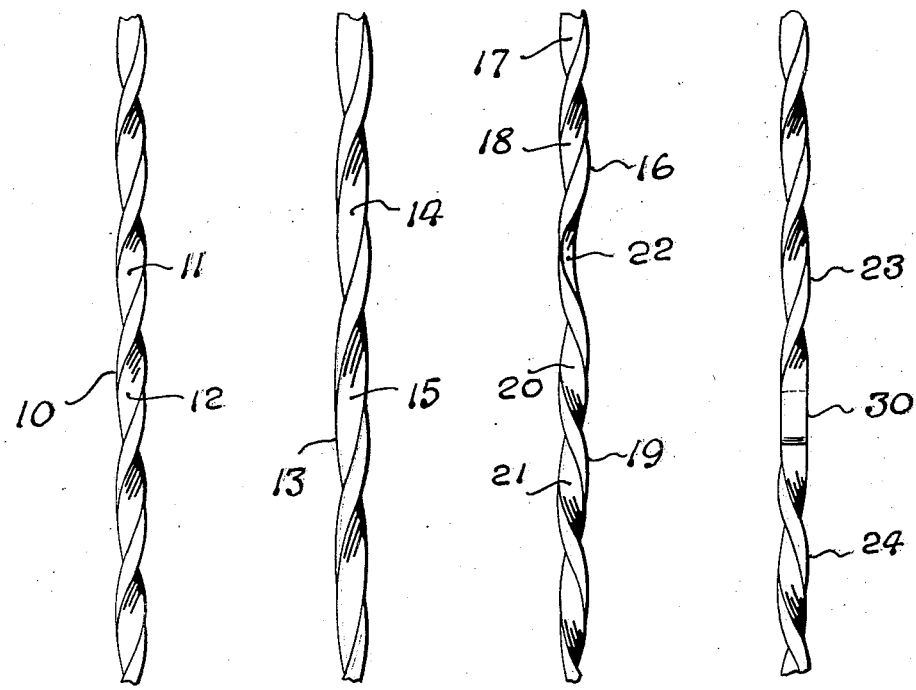
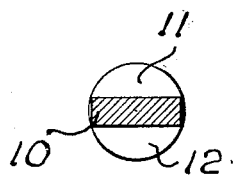
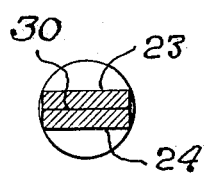
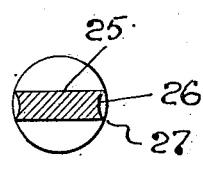
Fig. 3.   Fig. 6.   Fig. 7.
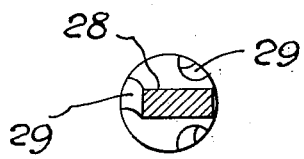
Fig. 8.
Pierre de Vitry D'Avocourt   INVENTOR
BY
ATTORNEY Patented June 4, 1935

2,003,994

UNITED STATES PATENT OFFICE 2,003,994

MARBLE-SAWING WIRE

Pierre de Vitry d'Avocourt, Basses-Pyrenees, France

Application June 26, 1934, Serial No. 732,482
In France May 15, 1933

5 Claims. (Cl. 125—12)

This invention relates to a sewing wire for use in cutting marble, granite, stone and other like material, and relates more particularly to an improved form of wire for use in sewing machines of the type in which it has heretofore been usual to employ a stranded wire spliced to form an endless saw carried on and driven by grooved pulleys and adapted to convey water and sand or other suitable abrasive material to the saw-cut.

One object of my present invention is to provide an improved saw wire having helical grooves formed therein and running in opposite directions in adjacent sections. A still further object is to provide a saw wire so shaped that the ends may be connected together—as by welding—without increasing the overall diameter of the wire.

With these and other objects in view the invention consists in the novel construction and form of the wire as illustrated in the accompanying drawing and particularly pointed out in the appended claims, it being understood that various changes in the form, proportion, and in minor details, may be made without departing from the spirit of the invention or sacrificing any of the advantages thereof.

In the drawing, Fig. 1 is an enlarged side view of a portion of my improved saw wire; Fig. 2 is a similar view showing a different pitch of the helix; Fig. 3 is a still further enlarged view showing one form of the saw wire in cross-section; Fig. 4 is a view corresponding to Figs. 1 and 2 but showing a portion of a wire with helical grooves running in different directions; Fig. 5 is a corresponding view showing portions of wire with a welded joint therein; Fig. 6 is a cross-sectional view corresponding to Fig. 3 but taken through the welded joint connecting the ends of sections of my improved wire; Fig. 7 is a similar cross-sectional view showing a slightly modified form of the wire; and Fig. 8 is a similar view showing still another form of the wire.

The saw wire shown at Fig. 1 is formed from a strip of hard steel 10 of rectangular or ribbon cross section twisted upon itself so as to form two helical grooves 11, 12, to furnish ample accommodation for abrasive material, such as sand, steel filings, emery or other suitable or convenient material in admixture with water or other liquid.

The saw wire shown at Fig. 2 is similarly formed but the strip or ribbon 13 is twisted to form helical grooves 14, 15 with a pitch much faster than that shown at Fig. 1.

In the form of saw shown at Fig. 4, the strip or ribbon has its upper section 16 twisted so as to form two helical grooves 17, 18, while the lower section 19 is twisted to form helical grooves 20, 21 the two latter grooves being left-hand, while the two former grooves are right-hand, and the right-hand groove 18 merges into the left-hand groove 20, while the right-hand groove 17 merges at 22 into the left-hand groove 21.

Fig. 5 shows a section of my improved wire formed from two portions of twisted or helically grooved steel strips or ribbons, 23, 24 with a lapped and welded joint at 30, see also Fig. 6. The strip 23 is formed with right-hand helical grooves, while the strip 24 is formed with left-hand grooves.

The strip or ribbon 25 shown at Fig. 7 is similar to that shown in the previous figures, except that the side edges 26 of the strip are formed with longitudinal grooves 26 of arcuate cross-section to provide relatively sharp cutting edges 27, and the strip 25 is twisted or shaped to form helical grooves as above described.

Fig. 8 shows a modified form of sawing wire, comprising a strip or ribbon 28 twisted or shaped to form two opposed helical grooves as described with reference to the preceding figures, but in Fig. 8 the edges of the strip 28 are formed with notches or recesses 29 to form additional cutting edges in the peripheral surface of the wire.

In order to prevent any tendency to shift or creep in a lateral direction, due to the helical formation of the sawing wire, the saw may be made up in sections having their ends connected together with the helix of adjacent sections facing in the opposite directions, and the connection is effected as shown at 30 Figs. 5 and 6—for example—without increasing the overall diameter of the saw and this permits the convenient employment of saw sections of any desired or convenient length.

My improved saw is preferably formed of a carbon steel having a manganese content of .5% and the joints are preferably formed by electric welding. The hard sawing wire, the ample accommodation for abrasive material and the effective joints without increased diameter enable me to provide and employ saw wires of smaller overall diameter than those previously employed and enable me to produce a smoother-sawn surface in the granite or other material, to greatly increase the sawing speed, and to successfully produce sawn slabs or sheets of minimum thickness.

If so desired, in certain cases, and for certain types of work, two or more of my improved saw wires may be employed in cooperation with each other, the helically grooved wires being twisted together for this purpose.

It will also be understood that the improved wires may be very effectively employed in multiple sawing machines, the wires being arranged to cut the marble or other material into slabs or sheets, or in other desired manner, and my improved wire may be very effectively employed with a suitable arrangement of guiding and driving pulleys so that one continuous endless wire may form a plurality of saw cuts simultaneously in the same block of material.

Although the drawing and the above specification disclose the best mode in which I have contemplated embodying my invention, I desire to be in no way limited to the details of such disclosure, for in the further practical application of my invention many changes in form and construction may be made as circumstances require or experience suggests, without departing from the spirit of the invention within the scope of the appended claims.

What I claim is:—

1. A saw wire of the character described comprising a uniform strip of hard steel having sections twisted to form opposed helical grooves for the accommodation of abrasive material, the helical grooves in adjacent sections being pitched in opposite directions.

2. A saw wire of the character described comprising similar sections, and flat end faces on the sections to form welded joints, the sections being twisted each upon itself to form overall cross-sectional dimensions that completely enclose the welded joints, and the twist in each section being in a direction opposite to the twist in the sections next adjacent thereto.

3. A saw of the character described comprising sections of helically grooved hard steel wires, and welded joints enclosed within the overall cross-sectional dimension of the saw, the helical grooves in adjacent sections being pitched in opposite directions.

4. A saw wire of the character described comprising a hard, metallic strip twisted upon itself to form oppositely disposed helical grooves pitched in opposite directions in different sections of the wire.

5. A saw wire of the character described comprising a metallic strip twisted about its own longitudinal center line to form helical grooves pitched in opposite directions in adjacent sections of the wire, and notches formed at intervals in the edges of the strip.

PIERRE DE VITRY D'AVOCOURT.